Aug. 15, 1961  H. O. IMUS ET AL  2,995,977
PROJECTION PRINTER
Filed May 22, 1958  2 Sheets-Sheet 2

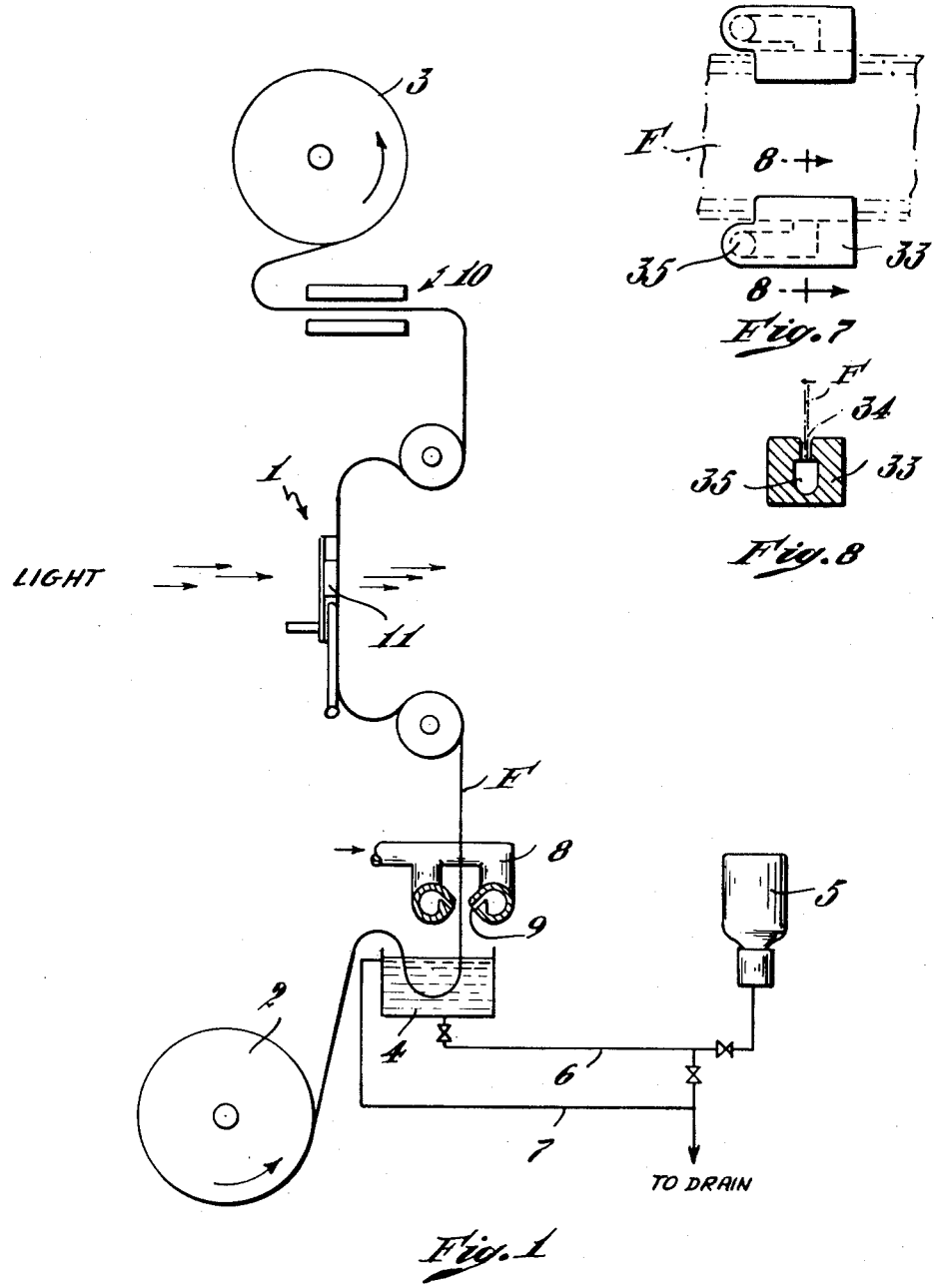

Inventors
Henry O. Imus
Joseph W. Schmit
by Roberts, Cushman + Grover
Attys

2,995,977
Patented Aug. 15, 1961

2,995,977
PROJECTION PRINTER
Henry O. Imus, Glendale, and Joseph W. Schmit, Van Nuys, Calif., assignors to Technicolor Corporation, Hollywood, Calif., a corporation of Maine
Filed May 22, 1958, Ser. No. 737,075
4 Claims. (Cl. 88—24)

In the art of cinematography it is customary to print a number of positives from a negative and in the repeated printings the negative frequently becomes scratched, thereby impairing the quality of the positives printed therefrom.

Objects of the present invention are to provide a projection printer which will print from scratched negatives without reproducing the scratches in substantial degree, which is simple and economical in construction and which is durable and reliable in use.

According to the present invention the printer is provided with means in advance of the film gate to wet the film with liquid having a refractive index substantially the same as that of the film, together with suction means at the edges of the film gate aperture to prevent the accumulation of excess liquid at these edges. Preferably the aperture is defined by a wall extending transversely of the film with an edge of the wall presented to the film and the suction means including a conduit outside the wall with serrations in the aforesaid edge for removing the accumulation of excess liquid at the edge. In the preferred embodiment the printer has air-jet means between the liquid-applying means and the film gate for distributing the liquid over the film and removing excess liquid.

It has been found that in certain instances the area of the film at the edges accumulates enough liquid so that the film movement mechanism will dislodge liquid into the moving parts and wash out lubricant. This accumulation can be removed by adding film edge suction means in the film path before the film enters the film gate. It is not normally needed with 35 mm. film moving vertically through the printer. However, when the film is moved horizontally through the printer, gravity causes a bead of liquid to form at the bottom of the film. A bead of liquid held at the top edge of horizontally moving film by surface tension is likely to form droplets when compressed by the film seating mechanism which can fall on the negative during exposure. Both edges of film moving horizontally through the printer and of any other film which accumulates an excess of liquid at the edges, should be treated with edge suction means before the film enters the film gate.

For the purpose of illustration a typical embodiment of the invention is shown in the accompanying drawings in which—

Figure 6:
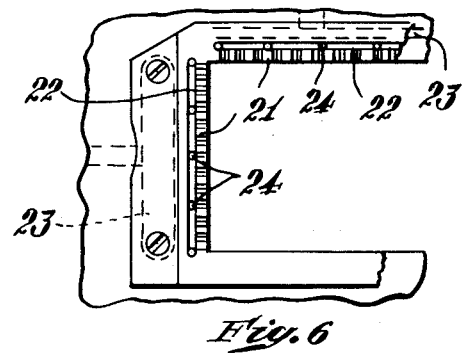
Figure 2:
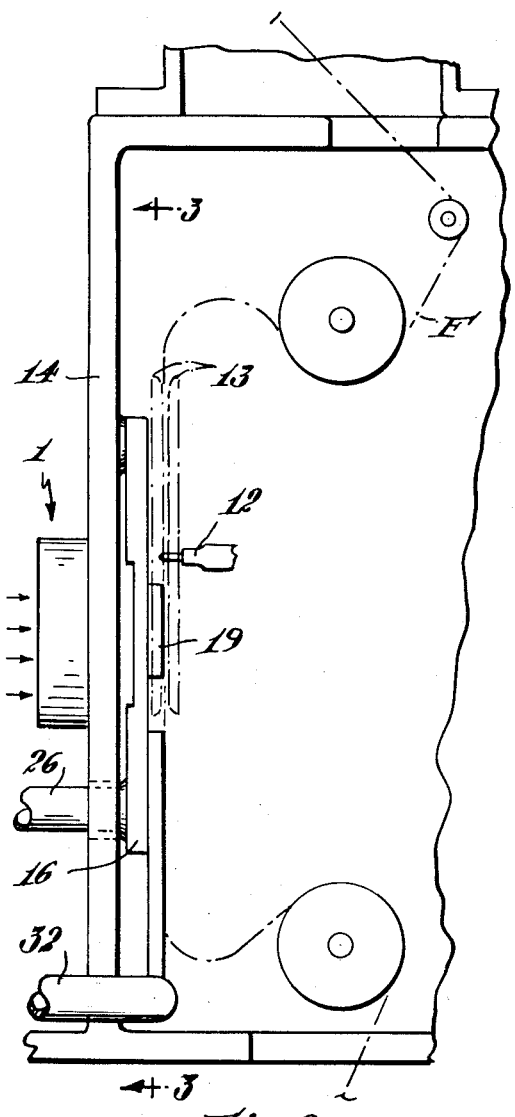
Figure 3:
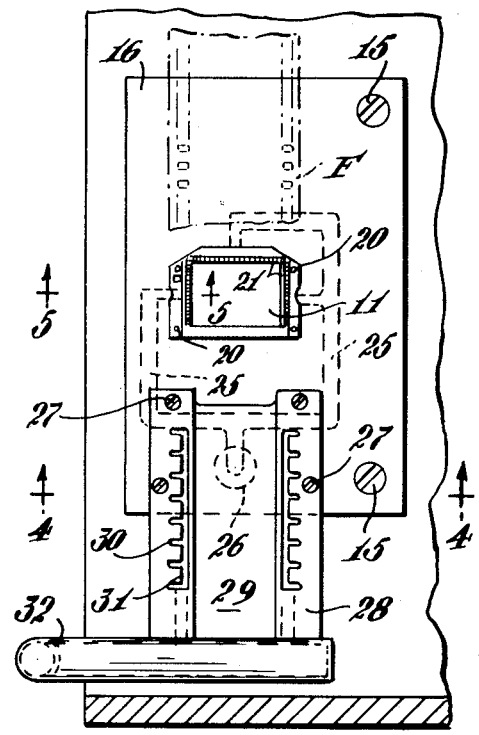
Figure 5:
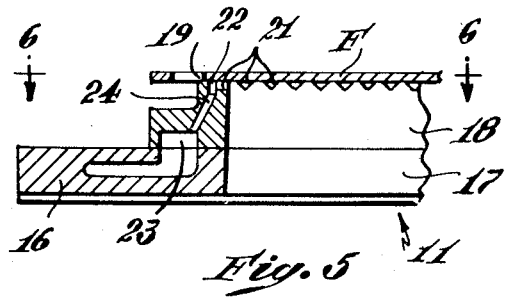
Figure 4:
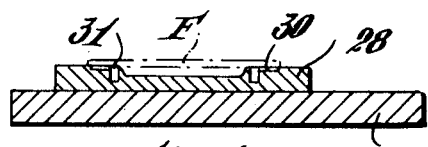

FIG. 1 is a diagrammatic view of the printer in which the film travels vertically through the film gate;
FIG. 2 is a side view of the printer;
FIG. 3 is a section on line 3—3 of FIG. 2;
FIG. 4 is a section on line 4—4 of FIG. 3;
FIG. 5 is a section on line 5—5 of FIG. 3;
FIG. 6 is an elevation from line 6—6 of FIG. 5;
FIG. 7 is a side view of a film traveling horizontally, showing means for removing liquid from the edges of the film; and
FIG. 8 is a section on line 8—8 of FIG. 7.

The particular embodiment of the invention chosen for the purpose of illustration in FIGS. 1 to 5 comprises a film gate 1 through which a film F is fed from a feed reel 2 to a take-up reel 3. Intermediate the feed reel and film gate is a tank 4 containing perchlorethylene or tetrachlorethylene or other liquid having an index of refraction substantially equal to that of the film F. The liquid in the tank is maintained at constant level by an ordinary gravity feed comprising a reservoir 5, supply duct 6 and overflow 7 containing the usual valves as indicated. Between the tank 4 and the film gate is a blow-off device 8 having air slots 9 directed downwardly across the entire width of each side of the film, thereby to distribute the liquid uniformly over the entire surface of the film and cause the excess liquid to flow back to the tank 4. Intermediate the film gate and take-up reel is a dryer 10 for drying the film. While any suitable dryer may be employed, one suitable dryer comprises a so-called impingement dryer in the form of a small dry box consisting of two enclosed plenum chambers with holes drilled on the sides facing the film and an exhaust duct to vent the air and vapors to the atmosphere.

As shown in FIGS. 2 to 6 the film gate comprises an aperture 11, intermittent film-feeding mechanism comprising pins 12, and shoes 13 for alternately guiding the film past the film gate and seating it on the aperture. While any suitable film gate mechanism may be employed, a suitable mechanism is shown in the patent to Ames 2,063,016. Mounted on the back of the front wall 14 by means of screws 15 is a plate 16 having a rectangular opening 17 which constitutes the outer part of the aperture 11, the inner portion of the aperture comprising a rectangular opening 18 in a plate 19 which is mounted on the inner face of the plate 14 by means of screws 20. As shown in FIGS. 3, 5 and 6 the inner edges of the top wall and side walls of the aperture are serrated at 21. Immediately outside the serrations are channels 22 communicating with channels 23 formed in the abutting faces of the plates 16 and 17 through ducts 24, the channels 23 communicating with a source of air suction through duct 25 in plate 16 and thence through a pipe 26. Thus air is drawn through the serrations 21 at each of three sides of the aperture to withdraw any liquid which tends to collect at these edges. The bottom edge of the aperture as shown in FIG. 3 is not provided with suction means but is undercut at the aperture-forming edge adjacent the film. Gravity keeps the liquid meniscus in the undercut portion so that the meniscus is not framed by the aperture and suction means are not required. It is obvious that in any case where an aperture-forming edge does not contact the negative, suction means are not needed. In apparatus using this invention, normally at least three of the aperture sides require suction means.

Mounted on the rear face of the lower end of the plate 16 by means of screws 27 is another plate 28 whose rear face is in alignment with the passageway for the film between the shoes 13. The rear face of this plate is recessed at 29 throughout the width of the picture areas of the film so as not to scratch the pictures. On each side of this recessed zone on the film seating surface are rows of openings 30 communicating with channels 31 inside the plate which in turn communicate with a pipe 32 leading to a suitable source of suction, thereby to break the pellicles of liquid bridging the sprocket holes and removing the liquid before the sprocket holes reach the aperture plate.

When the film movement comprising the shoes 13 seats the negative against the edges of the aperture a small meniscus of film tends to be formed between the film and the aperture edge. If this meniscus is not removed it must be masked off the print and the negative image must be slightly enlarged to replace the cropped margin. However by providing the aforesaid suction means around the aperture edges this undesirable procedure is obviated.

In printers of the type in which the film travels horizontally through the film gate, means should be provided in advance of the projection aperture to remove the liquid which tends to collect at the edges of the film. As shown in FIGS. 7 and 8 suitable means for this purpose comprises suction devices 33 having grooves 34 straddling the edges of the film, the grooves communicating with ducts 35 leading to suction means.

It should be understood that the present disclosure is for the purpose of illustration only and that this invention includes any and all modifications and equivalents which fall within the scope of the appended claims.

We claim:

1. For printing cinematographic film, a projection printer comprising a film gate having a projection aperture defined by a surface extending transversely of the film with an edge of the aperture forming a film seat, means for feeding film along a predetermined path extending through said gate, means along said path in advance of the gate to wet the film with liquid having a refractive index substantially the same as that of the film, suction means including a duct outside said surface and serrations in said edge communicating with said duct for preventing the accumulation of excess liquid at said edge, and means beyond the film gate for drying the film.

2. For printing a cinematographic film, a projection printer comprising a film gate having a projection aperture defined by a surface extending transversely of the film with an edge of the aperture forming a film seat, means for feeding film along a predetermined path extending through said gate, means along said path in advance of the gate to wet the film with liquid having a refractive index substantially the same as that of the film, suction means having inlets along the sprocket holes of the film in advance of said aperture to remove pellicles of liquid bridging the sprocket holes, said suction means including a duct outside said surface and serrations in said edge communicating with said duct for preventing the accumulation of excess liquid at said edge, and means beyond the film gate for drying the film.

3. For printing cinematographic film, a projection printer comprising a film gate having a projection aperture defined by a surface extending transversely of the film with an edge of the aperture presented to the film, means for feeding film along a predetermined path extending through said gate, means along said path in advance of the gate to wet the film with liquid having a refractive index substantially the same as that of the film, means between said wetting means and the gate for distributing the liquid over the film and removing excess liquid, suction means including a duct outside said surface and serrations in said edge communicating with said duct for preventing the accumulation of excess liquid at said edge, and means beyond the film gate for drying the film.

4. For printing cinematographic film, a projection printer comprising a film gate having a projection aperture defined by a surface extending transversely of the film with an edge of the aperture presented to the film, means for feeding film along a predetermined path extending through said gate, means along said path in advance of the gate to wet the film with liquid having a refractive index substantially the same as that of the film, means between said means and the gate for distributing the liquid over the film and removing excess liquid, suction means having inlets along the sprocket holes of the film in advance of said aperture to remove pellicles of liquid bridging the sprocket holes, said suction means including a duct outside said surface and serrations in said edge communicating with said duct for preventing the accumulation of excess liquid at said edge, and means beyond the film gate for drying the film.

References Cited in the file of this patent

UNITED STATES PATENTS

| | | |
|---|---|---|
| 1,208,664 | Russak et al. | Dec. 12, 1916 |
| 1,669,394 | Ellis et al. | May 8, 1928 |
| 1,816,409 | Steele | July 28, 1931 |
| 1,829,912 | Shearer | Nov. 3, 1931 |
| 1,957,904 | Ord | May 8, 1934 |
| 2,007,188 | Foster et al. | July 9, 1935 |
| 2,259,009 | Talbot | Oct. 14, 1941 |
| 2,446,668 | Tuttle et al. | Aug. 10, 1948 |
| 2,890,621 | Suits | June 16, 1959 |